United States Patent
Fink et al.

(10) Patent No.: US 10,929,274 B2
(45) Date of Patent: *Feb. 23, 2021

(54) FACILITATING DEBUGGING SERVERLESS APPLICATIONS VIA GRAPH REWRITING

(71) Applicant: International Business Machines Corporation, Armonk, NY (US)

(72) Inventors: Stephen Fink, Yorktown Heights, NY (US); Nicholas Matthew Mitchell, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/356,169

(22) Filed: Mar. 18, 2019

(65) Prior Publication Data

US 2019/0213111 A1 Jul. 11, 2019

Related U.S. Application Data

(63) Continuation of application No. 15/840,923, filed on Dec. 13, 2017, now Pat. No. 10,489,277, which is a
(Continued)

(51) Int. Cl.
*G06F 11/00* (2006.01)
*G06F 11/36* (2006.01)

(52) U.S. Cl.
CPC ........ *G06F 11/3664* (2013.01); *G06F 11/362* (2013.01); *G06F 11/3624* (2013.01)

(58) Field of Classification Search
CPC ............. G06F 11/0748; G06F 11/2294; G06F 11/142; G06F 11/1423; G06F 11/1425;
(Continued)

(56) References Cited

U.S. PATENT DOCUMENTS 10,768,920 B2 * 9/2020 Fontoura .................. G06F 8/65
2009/0300215 A1 * 12/2009 Gnanasambandam ......................
H04L 69/26
709/242
(Continued)

FOREIGN PATENT DOCUMENTS

| CN | 103237082 | 8/2013 |
| CN | 105117337 | 2/2015 |

OTHER PUBLICATIONS

Examination Report under Section 18(3) received for United Kingdom Application No. 1717042.4 dated Mar. 6, 2020.
(Continued)

*Primary Examiner* — Sarai E Butler
(74) *Attorney, Agent, or Firm* — Amin, Turocy & Watson, LLP

(57) ABSTRACT

Techniques that facilitate re-hosting a subset of a serverless application are provided. In one example, a system includes an interface component, a rewriter component and a broker component. The interface component receives identifier data from a computing device that identifies a portion of a serverless application to be re-hosted by the computing device. The computing device is in communication with the serverless computing system via a network device. The rewriter component rewrites the serverless application to allow the first portion of the serverless application to be executed by the computing device and another portion of the serverless application to be executed by the serverless computing system. The interface component re-routes the first portion of the serverless application to the computing device to facilitate a debugging session for the first portion of the serverless application that is performed by the computing device.

20 Claims, 10 Drawing Sheets

Related U.S. Application Data continuation of application No. 15/475,491, filed on Mar. 31, 2017, now Pat. No. 10,303,582.

(60) Provisional application No. 62/412,564, filed on Oct. 25, 2016.

(58) Field of Classification Search
CPC .. G06F 11/1428; G06F 11/20; G06F 11/2005; G06F 11/2007
USPC .................................................... 714/38.14
See application file for complete search history.

(56) References Cited

U.S. PATENT DOCUMENTS

| | | | |
|---|---|---|---|
| 2010/0250499 A1* | 9/2010 | McAlister | G06F 11/1451 707/679 |
| 2010/0251002 A1* | 9/2010 | Sivasubramanian | G06F 11/0793 714/2 |
| 2013/0144935 A1* | 6/2013 | Valdetaro | H04L 63/0281 709/203 |
| 2016/0378450 A1* | 12/2016 | Fu | G06F 8/60 717/177 |
| 2017/0024717 A1* | 1/2017 | Istrati | H04L 67/16 |
| 2017/0201569 A1* | 7/2017 | Fu | G06F 9/45558 |

OTHER PUBLICATIONS

Non-Final Office Action received for U.S. Appl. No. 15/840,923 dated Apr. 4, 2019, 31 pages.
Mitchell et al., "Method for Offloading Work in a Serverles Execution Environment", Oct. 18, 2016.
Roberts, "Serverless Architectures," Martinflower.com, Aug. 4, 2016, 1 page.
Github.com, "Serverless Offline Plugin," Last Accessed: Dec. 14, 2016, 1 page.
Github.com, "How to debug Serverless app by line-by-line/ breakpoint method using WebStorm?" 2016, 3 pages.
Search and Examination Report dated Apr. 16, 2018 for United Kingdom Application No. GB1717042.4, 7 pages.
Non-Final Office Action for U.S. Appl. No. 15/475,491, dated Aug. 28, 2018.
Mell, Peter, et al. "The NIST Definition of Cloud Computing." National Institute of Standards and Technology. Sep. 2011. 7 pages.
List of IBM Patents or Applications Treated as Related.

\* cited by examiner

US 10,929,274 B2

FACILITATING DEBUGGING SERVERLESS APPLICATIONS VIA GRAPH REWRITING

BACKGROUND

The subject disclosure relates to serverless computing systems, and more specifically, to debugging of a serverless application associated with a serverless computing system.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate re-hosting a subset of a serverless application are described.

According to an embodiment, a system can comprise an interface component, a rewriter component and a broker component. The interface component can receive identifier data from a computing device that identifies a first portion of a serverless application to be re-hosted by the computing device. The computing device can be in communication with the serverless computing system via a network device. The rewriter component can rewrite the serverless application to allow the first portion of the serverless application to be executed by the computing device and a second portion of the serverless application to be executed by the serverless computing system. The interface component can re-route the first portion of the serverless application to the computing device to facilitate a debugging session for the first portion of the serverless application that is performed by the computing device.

According to another embodiment, a computer-implemented method is provided. The computer-implemented method can comprise receiving, by a system operatively coupled to a processor, identifier data from a computing device that identifies a first portion of a serverless application to be re-hosted by the computing device, where the system is in communication with the computing device via a network device. The computer-implemented method can also comprise transmitting, by the system, the first portion of the serverless application to the computing device. Furthermore, the computer-implemented method can comprise facilitating, by the system, performance of a debugging session associated with the first portion of the serverless application via the computing device. The computer-implemented method can also comprise executing, by the system, a second portion of the serverless application.

According to yet another embodiment, a computer-implemented method is provided. The computer-implemented method can comprise determining, by a system operatively coupled to a processor, identifier data associated with a first portion of a serverless application. The computer-implemented method can also comprise transmitting, by the system, the identifier data to a serverless computing system via a network device. Furthermore, the computer-implemented method can comprise receiving, by the system, the first portion of the serverless application from the serverless computing system. The computer-implemented method can also comprise performing, by the system, a debugging session associated with the first portion of the serverless application approximately concurrently to execution of a second portion of the serverless application by the serverless computing system.

According to yet another embodiment, computer program product for debugging a serverless application can comprise a computer readable storage medium having program instructions embodied therewith. The program instructions can be executable by a processor and cause the processor to receive, by the processor, identifier data from a computing device that identifies a first portion of a serverless application associated with a serverless computing system. The program instructions can also cause the processor to transmit, by the processor, the first portion of the serverless application to the computing device. The program instructions can also cause the processor to execute, by the processor, a second portion of the serverless application during a debugging session by the computing device that debugs the first portion of the serverless application.

According to yet another embodiment, computer program product for debugging a serverless application can comprise a computer readable storage medium having program instructions embodied therewith. The program instructions can be executable by a processor and cause the processor to transmit, by the processor, identifier data associated with a first portion of a serverless application to a serverless computing system. The program instructions can also cause the processor to receive, by the processor, the first portion of the serverless application from the serverless computing system. The program instructions can also cause the processor to perform, by the processor, a debugging session associated with the first portion of the serverless application.

DETAILED DESCRIPTION

Figure 1:
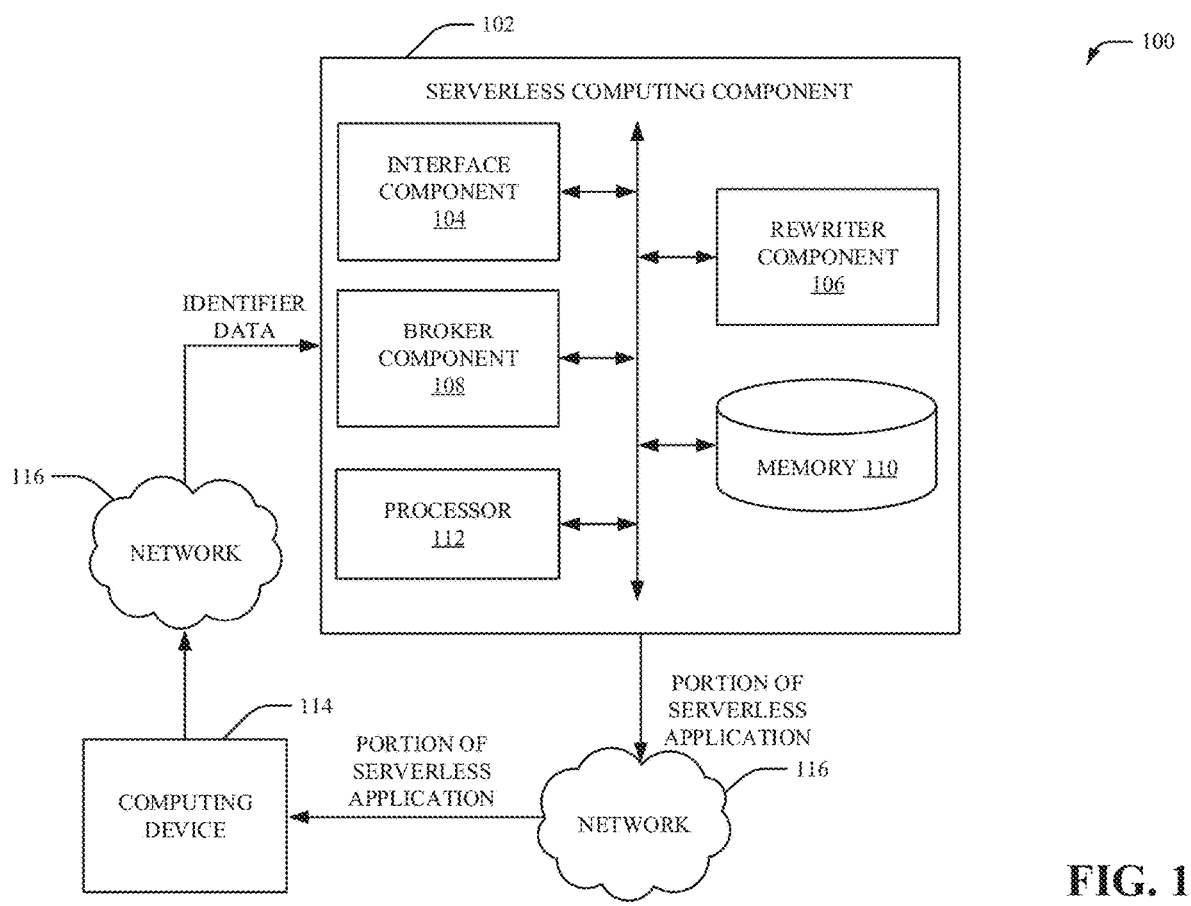
FIG. 1 illustrates a block diagram of an example, non-limiting system to facilitate re-hosting a subset of a serverless application in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Debugging of a cloud application is generally accomplished using logs related to the cloud application or snapshots corresponding to a state of the cloud application. For example, logs can be collected and/or curated to facilitate debugging of a cloud application. Alternatively, snapshots of a state of a cloud application can be analyzed to facilitate debugging of a cloud application. To further facilitate debugging of a cloud application, a cloud platform can provide a log collection and analysis utility that can be employed by a user. However, log collection and analysis has numerous downsides, especially with respect to debugging. For instance, high-volume cloud applications can generate vast quantities of data and/or can require advance planning (e.g., advance planning with respect to a type of content to log). Therefore, a log collection and analysis utility cannot provide a single-step experience common to debuggers. A log collection and analysis utility also cannot provide a capability to modify a program state as a user traverses through computer code of the cloud application. In certain instances, a system can augment logging with collection and visualization of snapshots of a state of the system. For instance, a debugger can allow a user to determine when to collect snapshots related to a state of a cloud application. The user can subsequently view these in a tool that emulates a subset of a full debugging experience. The tool can utilize moment-in-time snapshots, thereby allowing a user to view structure of memory, as well as the call stacks of the threads at the moment the snapshot was taken. However, encoding of timing information for moment-in-time snapshots (e.g., when the moment-in-time snapshots should be taken) is generally required to facilitate employing moment-in-time snapshots for debugging purposes. Furthermore, debugging tasks such as stepping through code and modifying program state are not possible when employing snapshots of a state of the system. In another example, a full debugging environment can be executed on a local machine of a developer. However, with the full debugging environment, a user is generally required to develop and debug locally prior to providing changes to a pipeline of tests and deployments. Furthermore, applications that run in these cloud platforms are typically executed by long-lived processes or long-lived virtual machines (VM).

A recent addition to the cloud computing landscape is that of serverless computing. A serverless computing platform generally combines event-driven programming (or publish-subscribe programming), auto-scaling, and a fine-grained pricing model. For example, a programmer can encode an event-driven program as a suite of event-action pairs, and can uploads the event-driven program to a service. The system listens for events, and maintains a pool of worker devices, which it uses to process the actions upon receipt of an event. In this way, a limited set resources can be shared amongst many, while charging only for use, not for uptime. That is, a serverless computing application running on a serverless computing platform generally only consumes a resource (e.g., a worker device) when active. In contrast, a cloud-hosted application consumes the valuable resource (e.g., a certain number of central processing unit cycles) for the duration of its deployment. Debugging a serverless computing application has numerous challenges. For example, debugging a serverless computing application generally involves attaching to a function, halting execution of the serverless computing application, and allowing a user of the debugger to control pace of that function's evaluation. However, this generally requires one or more critical worker resources to be monopolized for an indefinite period of time. Furthermore, a user may forget about the debug session and only recommence hours or days later.

Debugging a cloud application can also be problematic since the cloud application is running remotely from a computing device and on a platform that generally does not allow direct access by a computing device. An attach-and-inspect style debuggers can be employed to attach to a cloud application and/or inspect code of the cloud application since cloud applications are generally served by long-running processes. Moreover, debugging serverless applications further complicates debugging processes since serverless applications are generally not associated with long-running processes. Furthermore, attaching, and thus halting, a serverless application can negatively impact performance of a serverless environment. For example, runtimes often employ a limited size pool of threads and/or containers with which to service requests. A debugger can operate by attaching to a long-running process, halting its execution, and allowing a user to inspect the state of the process. Attach-and-halt debugging often need to leverage operating system features, such as traps. Often, attach-and-halt debugging also patch the executable, in order to support fine-grained breakpoints. Therefore, employing attach-and-halt for debugging of a serverless application would quickly reduce performance of a serverless environment associated with the serverless application. Lastly, given the complexity of a serverless platform, it is highly desirable to shift development and/or debugging tasks out of a runtime process associated with a serverless application.

To address these and/or other issues, embodiments described herein include systems that facilitate re-hosting a subset of a serverless application. For example, a subset of a serverless application hosted by a serverless cloud platform can be re-hosted by a computing device in communication with the serverless cloud platform via a network. Re-hosting of the subset of the serverless application can facilitate improved debugging of the serverless application. For instance, a portion of computer code associated with serverless application that is running on a serverless cloud platform can be re-hosted (e.g., offloaded from the serverless cloud platform) and/or debugged on a local computing device using a debugger program. Additionally or alternatively, re-hosting of the subset of the serverless application can facilitate execution of the subset of the serverless application by a computing device that is different than the serverless cloud platform. As such, performance of the serverless application can be improved. Furthermore, a reduced number of errors associated with a serverless application can be achieved. Moreover, a debugger for a serverless application can be employed without modifying core runtime of the serverless application.

FIG. 1 illustrates a block diagram of an example, non-limiting system 100 that facilitates re-hosting a subset of a serverless application in accordance with one or more embodiments described herein. Repetitive description of like elements employed in other embodiments described herein is omitted for sake of brevity.

In various embodiments, the system 100 can be a serverless cloud platform system. In an aspect, the system 100 can be a system for re-hosting a subset of a serverless application. Moreover, the system 100 can be associated with, employed with or included in a debugging system, a serverless computing system, a log analytics system (e.g., a real-time log analytics system), a log management system, a monitoring system, an operational intelligence system, a computing device system, an application management system, a server system, a network system, a web system, an on-premise system, a machine learning system, an artificial intelligence system, and/or another type of system. The system 100 can employ hardware and/or software to solve problems that are highly technical in nature, that are not abstract and that cannot be performed as a set of mental acts by a human. Further, some of the processes performed can be performed by a specialized computer (e.g., a specialized computer with a serverless computing component) for carrying out defined tasks related to memory operations. The system 100 and/or components of the system can be employed to solve new problems that arise through advancements in technology, employment of computing devices, employment of a cloud platform, debugging of serverless applications, execution of serverless applications and/or computer architecture, and the like. One or more embodiments of the system 100 can provide technical improvements to serverless cloud platform systems, debugging systems, log analytics systems (e.g., real-time log analytics systems), log management systems, monitoring systems, operational intelligence systems, computing device systems, application management systems, server systems, network systems, web systems, on-premise systems, machine learning systems, artificial intelligence systems, etc. One or more embodiments of the system 100 can also provide technical improvements to a computing device by improving debugging capabilities of the computing device.

In the embodiment shown in FIG. 1, the system 100 can include a serverless computing component 102. The serverless computing component 102 can be associated with a serverless computing system. For instance, in certain embodiments, a server can host the serverless computing component 102. As shown in FIG. 1, the serverless computing component 102 can include an interface component 104, a rewriter component 106 and a broker component 108. Aspects of the serverless computing component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the serverless computing component 102 can also include memory 110 that stores computer executable components and instructions. Furthermore, the serverless computing component 102 can include a processor 112 to facilitate execution of the instructions (e.g., computer executable components and corresponding instructions) by the serverless computing component 102. As shown, the interface component 104, the rewriter component 106, the broker component 108, the memory 110 and/or the processor 112 can be electrically and/or communicatively coupled to one another in one or more embodiments.

The serverless computing component 102 can be in communication with a computing device 114 via a network 116. The computing device 114 can be a hardware device that includes one or more processors. For instance, the computing device can be an electronic device (e.g., a consumer electronic device), a network device, a cloud device (e.g. a cloud component) and/or another type of device that can execute at least a portion of a serverless application. The network 116 can include one or more networks. For example, the network 116 can include one or more wireless networks and/or one or more wired networks, including but not limited to, a wide area network (WAN, e.g., the Internet), a local area network (LAN) and/or a cellular network. The network 116 can also include one or more network devices (e.g., network hardware, network equipment, computer networking devices, etc.) to facilitate communication and/or interaction between at least the computing device 114 and the serverless computing component 102.

In an embodiment, the interface component 104 can receive identifier data (e.g., IDENTIFIER DATA shown in FIG. 1) from a computing device 114. For instance, the computing device 114 can identify a first portion of a serverless application to be re-hosted by the computing device 114. The serverless application can be associated with a function as a service (FaaS) for a user so that the user can employ the serverless application without purchasing or renting a server or a virtual machine to run computer code associated with the serverless application. In one example, the serverless application can be stored by the serverless computing component 102 (e.g., by the memory 110). In another example, the serverless application can be stored on a server that hosts the serverless computing component 102 and/or a virtual machine that hosts the serverless computing component 102. The computing device 114 can re-host the first portion of the serverless application by executing the portion of the serverless application on the computing device 114 while a second portion of the serverless application is executed by the serverless computing component 102 (e.g., the server and/or the virtual machine associated with the serverless computing component 102). In an aspect, the rewriter component 106 can rewrite the serverless application to allow the first portion of the serverless application to be executed by the computing device 114 and the second portion of the serverless application to be executed by the serverless computing component 102. For instance, the rewriter component 106 can rewrite the serverless application as a graph of connected actions (e.g., a graph of computer-executable functions) that facilitate a debugging process for the serverless application without core runtime of the serverless application.

In an embodiment, the interface component 104 can re-route the first portion of the serverless application to the computing device 114 to facilitate a debugging session for the portion of the serverless application performed by the computing device 114 and/or to facilitate execution of the portion of the serverless application by the computing device 114. For example, in response to a determination that direct communication with the computing device 114 is possible (e.g., if the computing device 114 is a separate cloud device better suited for performing long-running computations associated with the first portion of the serverless application), the interface component 104 can re-route the first portion of the serverless application to the computing device 114.

In another embodiment, the broker component 108 can re-route the first portion of the serverless application to the computing device 114 to facilitate a debugging session for the first portion of the serverless application that is performed by computing device 114. Additionally or alternatively, the broker component 108 can re-route the first portion of the serverless application to the computing device 114 to facilitate execution of the first portion of the serverless application by the computing device 114. For example, in response to a determination that a serverless computing platform cannot communicate directly with the computing device 114 (e.g., the computing device 114 is not associated with an internet route that the serverless computing platform can communicate through), the interface component 104 can re-route the first portion of the serverless application to the computing device 114. In an aspect a user can employ a debugger program on the computing device 114 to facilitate debugging of the first portion of the serverless application during the debugging session. After debugging the first portion of the serverless application, the computing device 114 can transmit a modified version of the first portion of the serverless application (e.g., a debugged version of the first portion of the serverless application) to the serverless computing component 102. For instance the interface component 104 can receive the modified version of the first portion of the serverless application from the computing device 114. In another aspect, the rewriter component 106 can combine the modified version of the first portion of the serverless application with the second portion of the serverless application executed by the serverless computing component 102 during the debugging session. As such, an updated serverless application with improved stability, improved reliability, improved accuracy and/or improved quality can be provided.

In another embodiment, the computing device 114 can execute the first portion of the serverless application during a debugging process without modifying core runtime of the serverless application. For instance, the serverless application can continue executing a set of processing threads associated with the second portion of the serverless application while the computing device 114 is executing the first portion of the serverless application (e.g., while the computing device performs a debugging session associated with the first portion of the serverless application). In an aspect, the serverless application can include a set of primitive code segments that can be employed to create functionality for at least the serverless program. The set of primitive code segments can include, for example, a set of invocable actions provided by the serverless program, triggered invocation of actions by the serverless program, and/or curried evaluation of actions by the serverless program. In an aspect, the serverless application can be treated as a graph of connected actions, where the graph is rewritten in a way to support debugging. In an aspect, a debugger program executed by the computing device 114 can employ a combination of trampoline-style of instrumentation with a continuation-passing style of function invocation for functional programming. In certain embodiments, the first portion of the serverless application can be a first function in a sequence of functions. The interface component 104 can, for example, re-route the first function to the computing device 114. Furthermore, the rewriter component 106 can generate a second function prior to the first function in the sequence of instructions. The rewriter component 106 can also generate a third function after the first function in the sequence of instructions. The rewriter component 106 can execute the second function and the third function after the first function is re-routed to the computing device (e.g., the rewriter component 106 can execute the second function and the third function while the computing device 114 performs a debugging session associated with the first portion of the serverless application). In certain embodiments, the interface component 104 can receive real-time data generated based on a debugging session associated with the first portion of the serverless application. Furthermore, the rewriter component 106 can execute the second portion of the serverless application based on the real-time data associated with the debugging session.

In yet another embodiment, the serverless computing component 102 in combination with the computing device 114 can provide various modes of operation for debugging the serverless application. For example, a first mode for debugging the serverless application can be performed based on user data provided to the computing device 114 or another device in communication with the computing device 114 and/or the serverless computing component 102. The user data can include a set of actions associated with the one or more processing points related to the serverless application. Additionally or alternatively, the user data can facilitate manual invocation to manually invoke a programmable operator within computer code of the serverless application. In an aspect, the first mode can employ a trampoline computing process which forwards an invocation signal from the computing device 114 to the serverless computing component 102 (e.g., to the broker component 108). The invocation signal can include, for example, a set of parameters for an invocation to invoke a programmable operator within computer code of the serverless application. The invocation signal can be transmitted along with a trigger that is invoked when a debugging process performed by the computing device 114 is complete. In an aspect, the computing device 114 can be employed as a debug client that verifies that the trigger is generated with data (e.g., a return value) for a debugged action in response to a determination that a debugging process performed by the computing device 114 is complete. In certain embodiments, in response to a determination that a debugging process performed by the computing device 114 is associated with an error (e.g., a debugging process performed by the computing device 114 is abnormally terminated), the computing device 114 can generate the trigger with data (e.g., a return value) for a previously performed action (e.g., an original action) associated with the debugging process.

Additionally or alternatively, a second mode for debugging the serverless application can be performed based on the user data and analysis data generated based on analysis of the first portion of the serverless application and/or the user data. For instance, the second mode can provide a set of actions associated with the one or more processing points related to the serverless application. Furthermore, the second mode can also rewrite one or more portions of the first portion of the serverless application that intersect with the set of actions. In one example, with the second mode, the user data can be scanned for enclosing uses related to the set of actions. If an enclosing use is a sequence of actions $A1, \ldots, Ak, \ldots An$, where $Ak$ is the action to be debugged, then the sequence of actions can be divided into a sequence $S1$ and a second sequence $S2$. The first sequence $S1$ can be $A1, \ldots, T$ where $T$ is the trampoline for $Ak$. The second sequence $S2$ can be $C, \ldots, An$, where $C$ is the continuation for $Ak$.

Additionally or alternatively, a third mode for debugging the serverless application can be performed based on real-time data associated with the serverless application. For example, the real-time data can be generated based on execution of the first portion of the serverless application and/or the second portion of the serverless application. The real-time data can include, for example, real-time activations of one or more data flows. In an aspect, one or more data flows of the debugging process performed by the computing device 114 can be updated based on the real-time data. For example, a portion of the serverless application can be replaced with different computer code. Likewise, a sequence for a splice pair (e.g., S1 in the above example) can also be replaced.

Additionally or alternatively, a fourth mode for debugging the serverless application can be performed based on an increased processing speed. For example, the fourth mode can allow one or more data flows of the debugging process performed by the computing device 114 to run at an increased processing speed (e.g., at approximately a full processing speed for the debugging process) while executing one or more actions in such a way as to limit any outgoing requests by the first portion of the serverless application. With the fourth mode, a dispatcher D can be created and the dispatcher D can be used in place of one or more portions of the first serverless application. The dispatcher D can operate by "teeing" the invocation to both the original action (e.g., Ak above) and invoking another action associated with the first serverless application.

It is to be appreciated that the serverless computing component 102 (e.g., the interface component 104, the rewriter component 106 and/or the broker component 108) performs one or more processes associated with a serverless application that cannot be performed by a human (e.g., is greater than the capability of a single human mind). For example, an amount of data processed when executing at least a portion of a serverless application, a speed of processing of data when executing at least a portion of a serverless application and/or types of data processed by the serverless computing component 102 (e.g., the interface component 104, the rewriter component 106 and/or the broker component 108) over a certain period of time can be greater, faster and different than an amount, speed and data type that can be processed by a single human mind over the same period of time. The serverless computing component 102 (e.g., the interface component 104, the rewriter component 106 and/or the broker component 108) can also be fully operational towards performing one or more other functions (e.g., fully powered on, fully executed, etc.) while also performing the above-referenced one or more processes associated with a serverless application. Moreover, output generated by the serverless computing component 102 (e.g., the interface component 104, the rewriter component 106 and/or the broker component 108) can include information that is impossible to obtain manually by a user. For example, an amount of information generated by a serverless application and/or a variety of information generated by a serverless application can be more complex than information obtained manually by a user.

Figure 2:
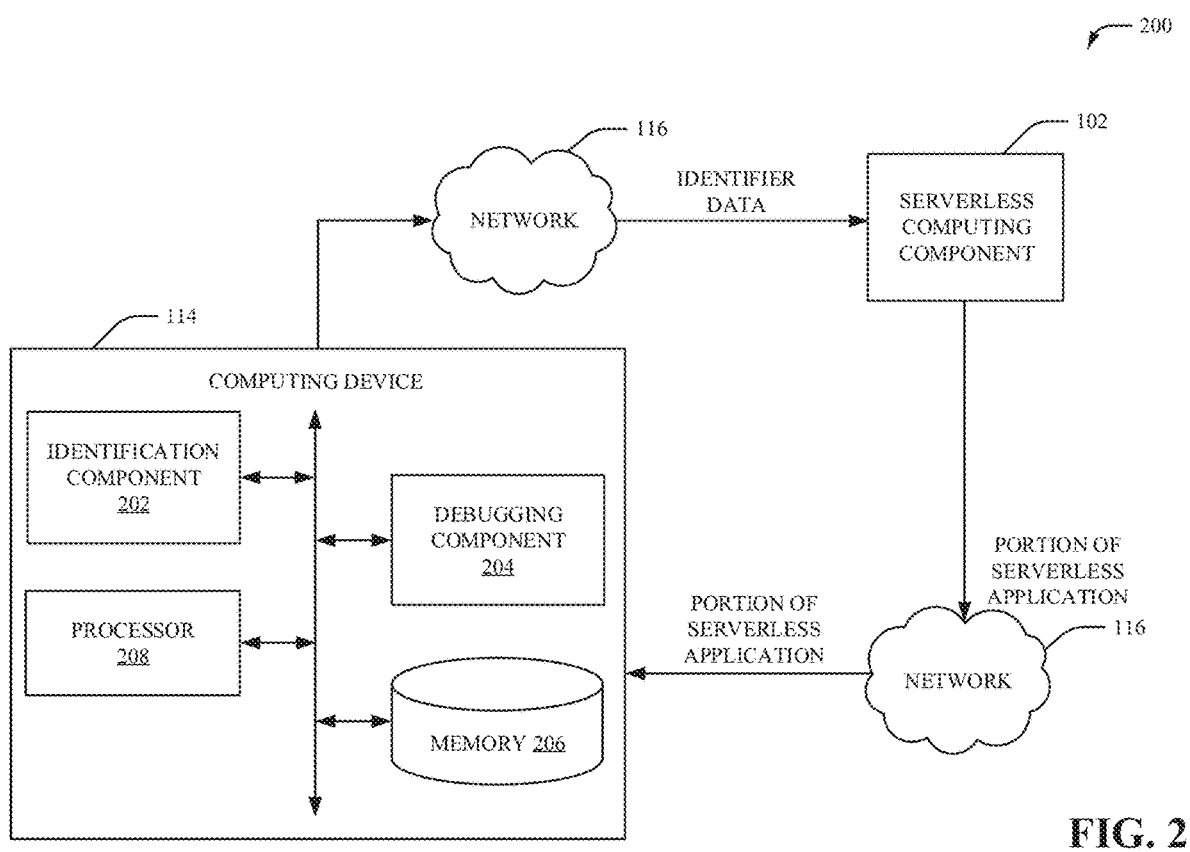
FIG. 2 illustrates a block diagram of another example, non-limiting system to facilitate re-hosting a subset of a serverless application in accordance with one or more embodiments described herein.

FIG. 2 illustrates a block diagram of an example, non-limiting system 200 that facilitates re-hosting a subset of a serverless application in accordance with one or more embodiments described herein. Repetitive description of like elements employed in other embodiments described herein is omitted for sake of brevity.

In various embodiments, the system 200 can be a serverless cloud platform system. In an aspect, the system 200 can be a system for re-hosting a subset of a serverless application. Moreover, the system 200 can be associated with, employed with or included in a debugging system, a serverless computing system, a log analytics system (e.g., a real-time log analytics system), a log management system, a monitoring system, an operational intelligence system, a computing device system, an application management system, a server system, a network system, a web system, an on-premise system, a machine learning system, an artificial intelligence system, and/or another type of system. The system 200 can employ hardware and/or software to solve problems that are highly technical in nature, that are not abstract and that cannot be performed as a set of mental acts by a human. Further, some of the processes performed can be performed by a specialized computer (e.g., a specialized computer with a serverless computing component) for carrying out defined tasks related to memory operations. The system 200 and/or components of the system can be employed to solve new problems that arise through advancements in technology, employment of computing devices, employment of a cloud platform, debugging of serverless applications, execution of serverless applications and/or computer architecture, and the like. One or more embodiments of the system 200 can provide technical improvements to serverless cloud platform systems, debugging systems, log analytics systems (e.g., real-time log analytics systems), log management systems, monitoring systems, operational intelligence systems, computing device systems, application management systems, server systems, network systems, web systems, on-premise systems, machine learning systems, artificial intelligence systems, etc. One or more embodiments of the system 200 can also provide technical improvements to a computing device by improving debugging capabilities of the computing device.

In the embodiment shown in FIG. 2, the system 200 can include the serverless computing component 102 and the computing device 114. As shown in FIG. 2, the computing device 114 can include an identification component 202 and a debugging component 204. Additionally, in certain embodiments, the serverless computing component 102 can include the interface component 104, the rewriter component 106 and the broker component 108. Aspects of the computing device 114 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the computing device 114 can also include memory 206 that stores computer executable components and instructions. Furthermore, the computing device 114 can include a processor 208 to facilitate execution of the instructions (e.g., computer executable components and corresponding instructions) by the computing device 114. As shown, the identification component 202, the debugging component 204, the memory 206 and/or the processor 208 can be electrically and/or communicatively coupled to one another in one or more embodiments.

The identification component 202 can generate the identifier data that identifies the first portion of the serverless application to be re-hosted by the computing device 114. For example, the identification component 202 can identify the first portion of the serverless application based on historical data indicative of previously-generated output data by the serverless application. Additionally or alternatively, the identification component 202 can identify the first portion of the serverless application based on metadata associated with the serverless application. Additionally or alternatively, the identification component 202 can identify the first portion of the serverless application based on user data provided by a user associated with the computing device 114 or another device.

The debugging component 204 can perform a debugging process associated with the first portion of the serverless application. For example, the debugging component 204 can execute the first portion of the serverless application based on a debugger application. In an embodiment, the debugging component 204 can receive, via the network 116, the first portion of the serverless application from the serverless computing component 102. Additionally or alternatively, the debugging component 204 can generate a modified version of the first portion of the serverless application based on the debugging process. The debugging component 204 can also transmit the modified version of the first portion of the serverless application to the serverless computing component 102 via the network 116. Additionally or alternatively, the debugging component 204 can generate real-time data associated with the debugging session. The real-time data can be output data generated by the debugging process and/or statistical data associated with the debugging process. The real-time data can also identify one or more errors associated with the first portion of the serverless application. The debugging component 204 can also transmit the real-time data to the serverless computing component 102 via the network 116. In an aspect, the debugging component 204 can perform the debugging session associated with the first portion of the serverless application approximately concurrently to execution of the second portion of the serverless application by the serverless computing component 102 (e.g., a server or a serverless computing system associated with the serverless computing component 102).

It is to be appreciated that the computing device 114 (e.g., the identification component 202 and/or the debugging component 204) performs a debugging process associated with at least a portion of a serverless application that cannot be performed by a human (e.g., is greater than the capability of a single human mind). For example, an amount of data processed when performing a debugging process associated with at least a portion of a serverless application, a speed of processing of data when performing a debugging process associated with at least a portion of a serverless application and/or types of data processed by the computing device 114 (e.g., the identification component 202 and/or the debugging component 204) over a certain period of time can be greater, faster and different than an amount, speed and data type that can be processed by a single human mind over the same period of time. The computing device 114 (e.g., the identification component 202 and/or the debugging component 204) can also be fully operational towards performing one or more other functions (e.g., fully powered on, fully executed, etc.) while also performing the above-referenced one or more processes associated with a serverless application. Moreover, output generated by the computing device 114 (e.g., the identification component 202 and/or the debugging component 204) can include information that is impossible to obtain manually by a user. For example, an amount of information generated by a debugging process and/or a variety of information generated by a debugging process can be more complex than information obtained manually by a user.

Figure 3:
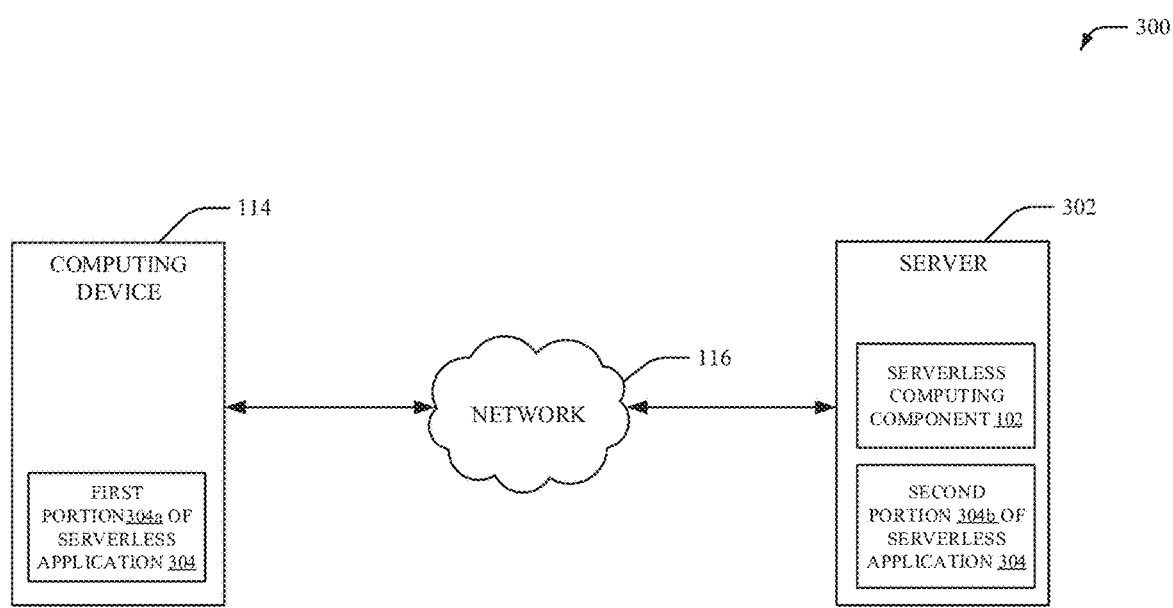
FIG. 3 illustrates a block diagram of yet another example, non-limiting system to facilitate re-hosting a subset of a serverless application in accordance with one or more embodiments described herein.

FIG. 3 illustrates a block diagram of an example, non-limiting system 300 that facilitates re-hosting a subset of a serverless application in accordance with one or more embodiments described herein. Repetitive description of like elements employed in other embodiments described herein is omitted for sake of brevity.

The system 300 can include the computing device 114 and a server 302. The computing device 114 can be in communication with the server 302 via the network 116. In an embodiment, the server 302 can include the serverless computing component 102. In an alternate embodiment, the serverless computing component 102 can be implemented on another server in communication with the server 302.

The system 300 can be a serverless platform that can enable a hybrid execution model where only portions of a serverless application to debugged is provided through debug paths associated with the computing device 114, while a remainder of the serverless application is executed by a cloud platform associated with the server 302. Therefore, it is possible to employ properties of a serverless platform (e.g., properties which would normally be used to write serverless applications) to excise and offload one or more functions of serverless application to the computing device 114 for debugging. The computing device 114 can be, for example, an offload target for a serverless application. As used herein, an "offload target" can be a machine on which a debugging session for a serverless application is executed. In certain embodiments, a serverless debugger can be written as a serverless application. Additionally, by offloading one or more functions of serverless application from a cloud platform associated with the server 302, a user can be offered a native debugging experience via the computing device 114. For example, if a function of a serverless application associated with the server 302 is written in a particular programming language, a user of a debugger associated with the computing device 114 can use a native debugger or another debugger preferred by the user. As used herein, a "function" can be computer code that is executed in response to an event. In certain embodiments, a function can receive input in the form of an argument tuple (x1, . . . , xn), and return a result tuple (r1, . . . , rm). Execution of a function can also produce a sequence of log records (l1, . . . , lt) that is separate from return value generated by the function. In a non-limiting example, if a serverless application provides output of a particular function a to f, and provides output of f to another function b, then a function sequence can be considered a→f→b a function sequence. Furthermore, a result of a sequence can be considered a result of the final function in the function sequence. In another non-limiting example, if execution of f is programmed in such a way so as to be triggered by some event e, e↦f can be considered a rule, and f can be considered an event-triggered action.

In certain embodiments, a subset of a serverless application of a serverless platform can be re-hosted on the computing device 114. For instance, a first portion 304a of a serverless application 304 can be executed by the computing device 114 and a second portion 304b of the serverless application 304 can be executed by the server 302 and/or the serverless computing component 102. The first portion 304a of the serverless application 304 can be, for example, a portion of the serverless application 304 to be debugged by the computing device 114. For instance, the first portion 304a of the serverless application 304 can be employed for debugging purposes. Additionally, the first portion 304a of the serverless application 304 can be executed in an alternate computing environment (e.g., the first portion 304a of the serverless application 304 can be executed by the computing device 114 and the second portion 304b of the serverless application 304 can be executed by the server 302) in response to a determination that the first portion 304a of the serverless application 304 is not suitable for execution by a particular serverless platform (e.g., the server 302).

In a non-limiting example, the computing device 114 can identify a function $f$ to be debugged. When debugging the function $f$ via the computing device 114, basic input-output expectations of the server 302 can be preserved. Thus, if the function $f$ returns $(r_1, \ldots, r_m)$ and generates a log $(l_1, \ldots, l_t)$ when executed by the server 302, then the debugged version of the function $f$ that is executed by the computing device 114 can be capable of producing identical results. Furthermore, if the function $f$ contributes to other constructs being executed by the server 302, the other constructs can continue to execute via the server 302 as if no debugging session were in progress. For example, if the function $f$ executes as part of a sequence of function evaluations a→f→b, or if the function $f$ is a event-triggered action (e.g., e↦f), then both constructs can execute as often and with the same results as if the function $f$ were not being debugged.

In an embodiment, the computing device 114 and the server 302 can be implemented together as a serverless execution environment. In an aspect, the serverless execution environment can support a set of primitive operations associated with creation of a standalone function (e.g., a subroutine that is not linked to any triggering event). Furthermore, the serverless execution environment can facilitate creation of an application-defined parameterized trigger. The serverless execution environment can also facilitate programmatic creation and destruction of an event source. Therefore, a set of topics can be extended and reduced in an ad hoc manner. Additionally, the serverless platform can support firing of these triggers programmatically. Parameters passed to the programmatic firing of an event can be passed on as input to a set of event-triggered actions associated with the trigger. Additionally, the serverless execution environment can facilitate creation of a custom rule that connects such an application-defined trigger to execution of a function. The serverless execution environment can also facilitate support function binding in order to avoid code cloning. In an aspect, the serverless execution environment can support a curried form of partial evaluation whereby a function $f(x_1, x_2, \ldots, x_n)$ can be bound to a new name g such that $g(x_2, \ldots, x_n) = f(x_1)$. As such, hazards such as code skew can be minimized and/or performance of a serverless application can be increased.

In another embodiment, the computing device 114 can employ a binding process during execution of the first portion 304a of the serverless application 304 to allow execution of the function $f$ in a context that only knows about $x_2, \ldots, x_n$. For example, if a debugging process associated with the first portion 304a of the serverless application 304 requires an additional parameter $x_1$ in order to facilitate completion of the debugging process, then binding can allow creation of a function g that can masquerade as the function $f$ without having to clone and modify the first portion 304a of the serverless application 304. In another embodiment, the first portion 304a of the serverless application 304 can be a single function of the serverless application 304. As such, the single function of the serverless application 304 can be extracted from the server 302 and can be executed on the computing device 114 (e.g., the single function of the serverless application 304 can be executed on a machine separate from a serverless execution platform). In one example, a set of constructs can be created from the single function. The set of constructs can implement the single function using continuation passing. This can allow a debugging process that is performed by the computing device 114 to suspend execution of the single function without one or more other processing functionalities in the serverless execution platform.

Figure 4:
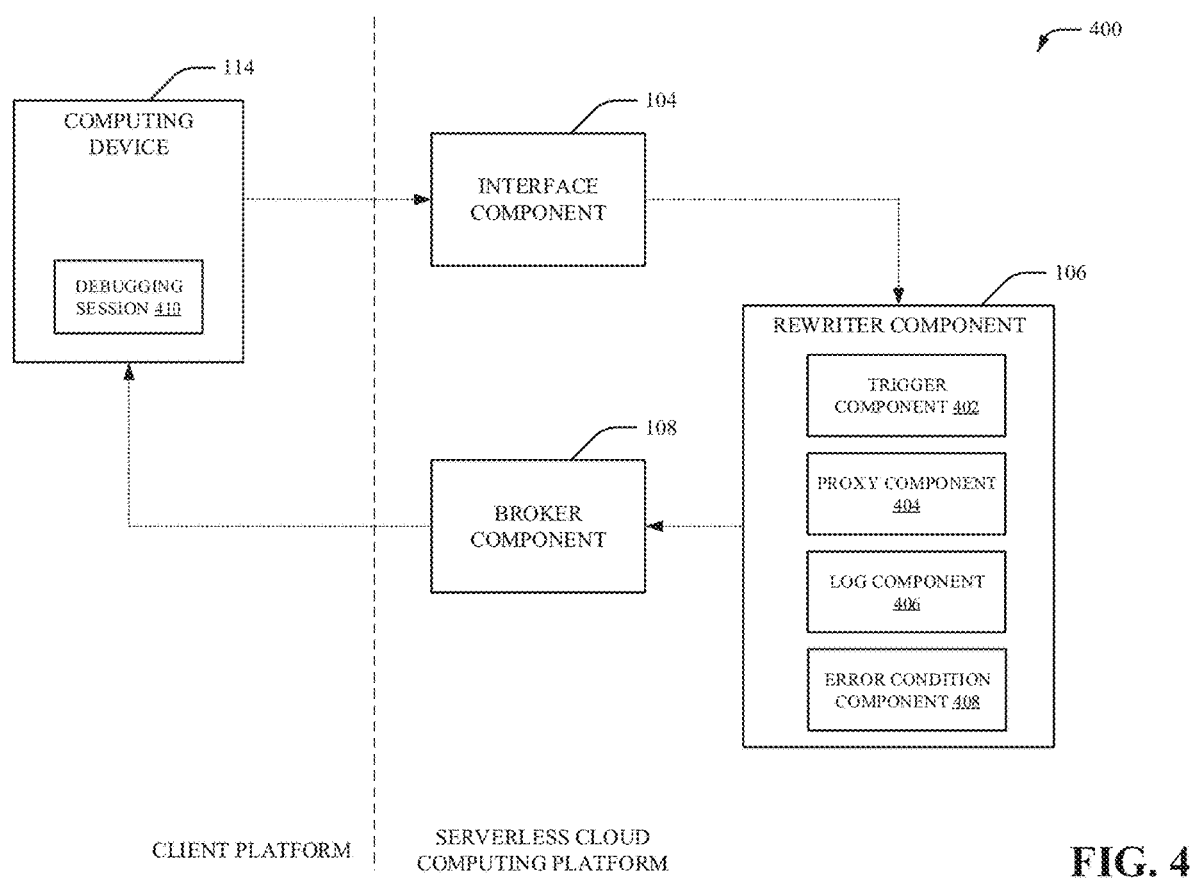
FIG. 4 illustrates an example, non-limiting system that facilitates a debugging session in accordance with one or more embodiments described herein.

FIG. 4 illustrates an example, non-limiting system 400 that facilitates a debugging session in accordance with one or more embodiments described herein. Repetitive description of like elements employed in other embodiments described herein is omitted for sake of brevity.

The system 400 includes the interface component 104, the rewriter component 106, the broker component 108 and the computing device 114. The interface component 104, the rewriter component 106 and the broker component 108 can be associated with a serverless cloud computing platform. The computing device 114 can be associated with a client platform. The rewriter component 106 can include a trigger component 402, a proxy component 404, a log component 406 and/or an error condition component 408. The trigger component 402, the proxy component 404, the log component 406 and/or the error condition component 408 can facilitate execution of a debugging session 410 performed by the computing device 114. In the embodiment shown in FIG. 4, the system 400 can illustrate a process flow for successful debug session with respect to the serverless cloud computing platform in accordance with one or more embodiments described herein. In an alternative embodiment shown in FIG. 4, a system 400 can illustrate process flow for an abort debug session with respect to the serverless cloud computing platform.

In an embodiment, the computing device 114 can communicate with the rewriter component 106 via a brokering communication facilitated via the interface component 104 and/or the broker component 108. For instance, the rewriter component 106 can indirectly communicate with the computing device 114. In an aspect the debugging session 410 can be executed on the computing device 114 via a debugger application implemented on the computing device 114. The debugging session 410 can execute the first portion 304a of the serverless application 304, for example. In another aspect, the broker component 108 can be a service broker to facilitate communication between the rewriter component 106 and the computing device 114. In one example, the broker component 108 can employ a virtual private network (VPN) tunneling service (e.g., a commodity VPN service) to facilitate communication between the rewriter component 106 and the computing device 114. As such, a secure tunnel can be provided between the rewriter component 106 and the computing device 114. An installation step can be performed on the computing device 114 to acquire one or more VPN credentials for the secure tunnel between the rewriter component 106 and the computing device 114. In certain embodiments, acquisition of the one or more VPN credentials can be accomplished via a cloud service that monitors for requests such as, for example, offload target registration requests, upstream handoff debug initiation requests, etc. The requests can be accompanied, for example, by pre-existing serverless platform credentials of a user identity associated with the computing device 114. Furthermore, the broker component 108 can employ the one or more VPN credentials to connect the rewriter component 106 and the computing device 114 in a secure manner. However, in certain embodiments where the computing device 114 is accessible directly by the rewriter component 106, the computing device 114 can initiate communication directly with the rewriter component 106 (e.g., without employing the broker component 108).

In an embodiment, a set of artifacts (e.g., a set of assets) can be generated by the rewriter component 106 based on the first portion 304a of the serverless application 304 (e.g., one or more functions of the serverless application) that is debugged by the computing device 114. The set of artifacts can include, for example, a first artifact generated by the trigger component 402. The first artifact can be related to an on-done trigger T generated by the trigger component 402. For instance, a debugged function can be generated (e.g., when a debugging session is complete) based on on-done trigger T generated by the trigger component 402. The debugged function can include log records $(l_1, \ldots, l_t)$, and can return a result $(r_1, \ldots, r_m)$. The on-done trigger T generated by the trigger component 402 can be generated and executed as $T(r_1, \ldots, r_t, l_1, \ldots l_t)$.

Additionally or alternatively, the set of artifacts can include a second artifact generated by the proxy component 404. The second artifact can be related to an upstream handoff function U generated by the proxy component 404. The upstream handoff function U can act as a proxy between the server 302 and the computing device 114. For instance, if a single function $f$ comprises type $(x_1, \ldots, x_n) \mapsto (r_1, \ldots, r_m)$, then the upstream handoff function U can comprise type $(T, f, x_1, \ldots, x_n) \mapsto (r_1, \ldots, r_m)$. The upstream handoff function U can be a serverless function that, based on the on-done trigger T and the first portion 304a of the serverless application 304 (e.g., the single function $f$), can acquire a source for the first portion 304a of the serverless application 304. The upstream handoff function U can also send computer code, the on-done trigger T, and/or a set of parameters $(x_1, \ldots, x_n)$ to the computing device 114. In an aspect, the upstream handoff function U can be presented to the computing device 114 as if it were the single function $f$ by creating a bound form $U_f=U(T, f)$. In this way, the bound form $U_f$ of the upstream handoff function and the first portion 304a of the serverless application 304 (e.g., the single function $f$) can include a corresponding type signature, and thus can be employed as a set of constructs (e.g., a sequences or a set of rules) that employ the first portion 304a of the serverless application 304 (e.g., the single function $f$).

Additionally or alternatively, the set of artifacts can include a third artifact generated by the log component 406. The third artifact can be related to a downstream handoff function D generated by the log component 406. In order to allow the second portion 304b of the serverless application 304 to execute as if the first portion 304a of the serverless application 304 (e.g., the single function $f$) is not being debugged by the computing device 114, the third artifact can be generated by the log component 406. The third artifact can represent completion of execution of the first portion 304a of the serverless application 304 (e.g., the single function $f$). Thus, any subsequent queries for results or log records for invocations of the first portion 304a of the serverless application 304 (e.g., the single function $f$) can be properly serviced. If the first portion 304a of the serverless application 304 (e.g., the single function $f$) returns $(r_1, \ldots, r_m)$ and creates log records $(l_1, \ldots, l_t)$, the downstream handoff function D can be equal to $D(r_1, \ldots, r_m, l_1, \ldots, l_t)$. Furthermore, the downstream handoff function D can return and/or log values associated with $(r_1, \ldots, r_m, l_1 \ldots, l_t)$. Additionally or alternatively, the set of artifacts can include a fourth artifact generated by the log component 406. The fourth artifact can be related to a continuation rule R generated by the log component 406. The continuation rule R can instruct the server 302 to turn the downstream handoff function D into an event-triggered action via $T \mapsto D$, where the event-triggered action is associated with an event related to the debugging session 410.

Additionally or alternatively, the set of artifacts can include a fifth artifact generated by the error condition component 408. The fifth artifact can be related to a circuit breaker function C generated by the error condition component 408. In certain embodiments, the fifth artifact can be created for an execution path associated with an error related to the debugging session 410. For example, the computing device 114 may prematurely exit the debugging session 410 before the first portion 304a of the serverless application 304 being debugged has completed. In another example, in a debugger associated with the debugging session 410, the computing device 114 may modify the first portion 304a of the serverless application 304 in such a way that the debugging session does not successfully complete execution of the first portion 304a of the serverless application 304. In yet another example, there may be an error in an offloading process associated with the debugging session 410 that executes the first portion 304a of the serverless application 304. In any such case, the computing device 114 can perform one or more actions to preserve a facade of correct execution of the first portion 304a of the serverless application 304 such that the serverless cloud computing platform determines that the first portion 304a of the serverless application 304 is executed properly. For instance, the circuit breaker function C can be created that, analogous to the upstream handoff function U, takes as input the on-done trigger T, the first portion 304a of the serverless application 304 (e.g., the single function $f$), and a set of arguments $(x_1, \ldots, x_n)$. The circuit breaker function C can programmatically invoke the first portion 304a of the serverless application 304 (e.g., the single function $f$) against the set of arguments $(x_1, \ldots, x_n)$. The circuit breaker function C can also execute the on-done trigger T with the output of the first portion 304a of the serverless application 304 (e.g., the single function $f$). In response to detection of an error condition, the computing device 114 can invoke the fifth artifact related to the circuit breaker function C.

In certain embodiments, the upstream handoff function U can notify the computing device 114 of a requested debugging session. The computing device 114 can inject on-done trigger T into a function source for the first portion 304a of the serverless application 304 (e.g., the single function $f$). The computing device 114 can also determine and/or compile a debugger application for the debugging session 410 that can be capable of handling the first portion 304a of the serverless application 304 (e.g., the single function $f$). To inject the on-done trigger T into the first portion 304a of the serverless application 304 (e.g., the single function $f$), the computing device 114 can perform an on-done trigger algorithm. In an example where a function associated with the first portion 304a of the serverless application 304 is called $f$, the on-done trigger is called T, and the function $f$ is written in a particular programming language, the offload target algorithm can generate the following computer code:

```
// intercept logging calls
var logs = [ ];
var log = console.log;
console.log = message => logs.push(message);
var result = f(x_1, ..., x_n);
fire(T, { result: result, logs: logs });
```

The fire command "fire( )" can facilitate communication with the server 302 to fire a given trigger with a given record. The downstream handoff function D can be generated to facilitate interpretation of a given result and a set of log records. After injecting the on-done trigger T, a compiler and debugger associated with the debugging session 410 on the computing device 114 can determine an invocation of the function $f$. For example, if the first portion 304a of the serverless application 304 is written in a particular programming language, the computing device 114 can employ a compiler for the particular programming language to compile the first portion 304a of the serverless application 304, and then invoke a debugger for the particular programming language. In order to determine whether the circuit breaker function C should be invoked, the computing device 114 can monitor the compiler and debugger associated with the debugging session 410 for certain activity (e.g., unexpected exits from a debugging process, premature exits from a debugging process, etc.).

Figure 5:
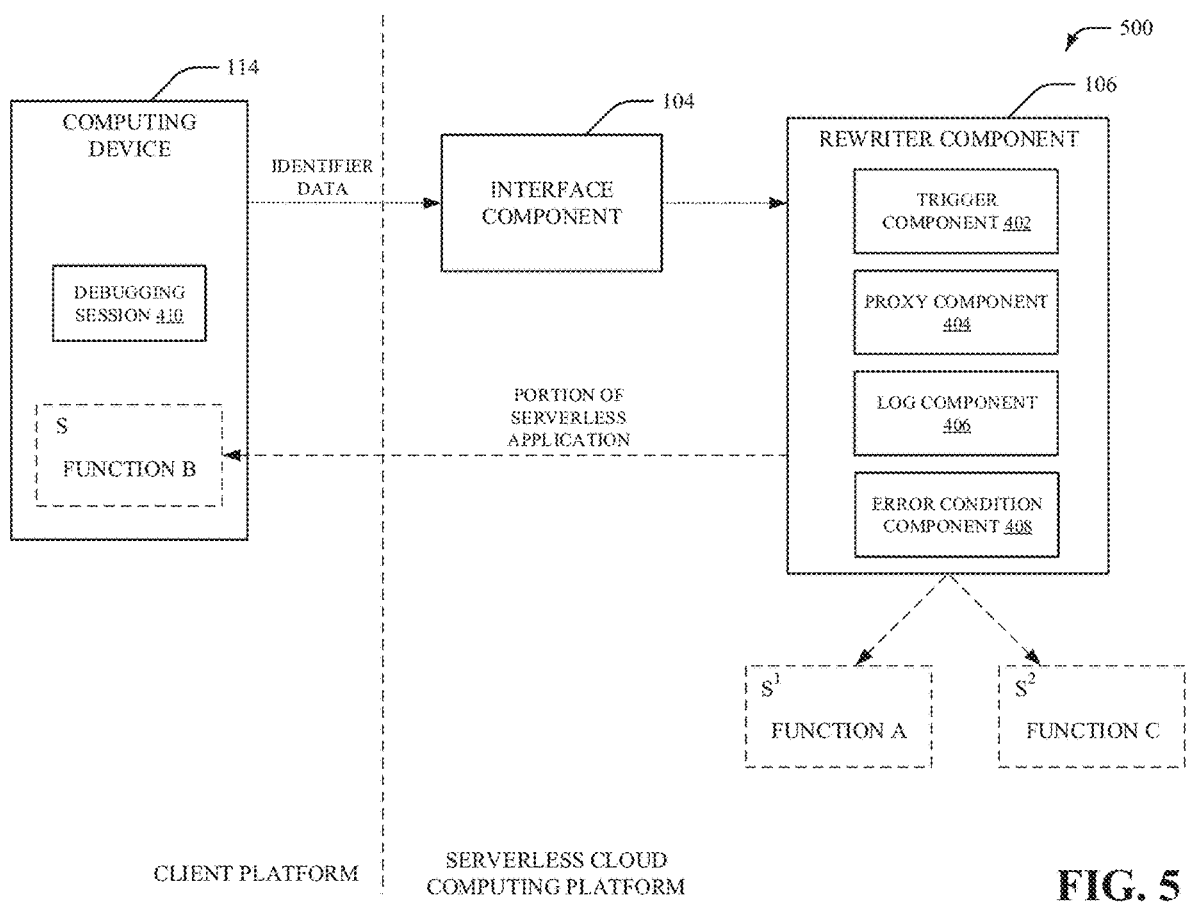
FIG. 5 illustrates another example, non-limiting system that facilitates a debugging session in accordance with one or more embodiments described herein.

FIG. 5 illustrates an example, non-limiting system 500 that facilitates a debugging session in accordance with one or more embodiments described herein. Repetitive description of like elements employed in other embodiments described herein is omitted for sake of brevity.

In the embodiment shown in FIG. 5, the system 500 illustrates debugging with respect to a function sequence A→B→C. For instance, the identifier data generated by the computing device 114 can identify a function B to be debugged via the debugging session 410 of the computing device 114. The function B can be associated with at least a function A and a function C. For example, the function B can exist in a function sequence where function A provides information to function B and function B provides data to function C. As such, the rewriter component 106 can provide the function B to the computing device 114 to be executed by the computing device 114 while the function A and the function B are executed by the serverless cloud computing platform (e.g., the serverless cloud computing platform associated with the server 302).

Limiting offloading associated with the computing device 114 to the function B rather than offloading the function A, the function B and the function C to the computing device can facilitate minimizing reduced computing performance of a serverless application associated with the function A, the function B and the function C. Furthermore, in certain embodiments, the function A and the function C can be written in a programming language that not supported by the debugging session 410. For instance, the function B can be written in a first programming language, and the function A and the function C can be written in at least a second programming language that is different than the first programming language.

To facilitate offloading of the function B to the computing device 114, a set of artifacts can be generated by the rewriter component 106. For instance, the rewriter component 106 can generate a first sequence $S^1$ associated with the function A and a second sequence $S^2$ associated with the function B. The first sequence $S^1$ can be equal to $S^1=a \rightarrow U_b$, where $U_b$ is an upstream handoff function associated with the proxy component 404 that is created for the function B. The second sequence $S^2$ can be equal to $S^2=D_b \rightarrow c$, where $D_b$ is a downstream handoff sequence associated with the log component 406 that is created for the function B.

When debugging the function B, a continuation rule can trigger invocation of the downstream handoff function $D_b$. When splicing a sequence associated with the function B, the continuation rule can alternatively invoke the second sequence $S^2$. As such, a net effect of invoking the first sequence $S^1$ and the second sequence $S^2$ can be the same as if an original sequence S was invoked. An output of the second sequence $S^2$ can therefore match output of the original sequence S, and all intervening logs and records of invocation for the constituent actions can be preserved.

In an embodiment, the debugging session 410 can be further optimized by diminishing log records and/or invocation records. For instance, the debugging session 410 can be performed without the downstream handoff function $D_b$. Logs and result records for the function B can be minimized and the second sequence $S^2$ can begin with the function C since the downstream handoff $D_b$ can be created to provide log and activation records that reflect completion of an invocation associated with the function B. The second sequence $S^2$ can be employed to facilitate generation of output by the original sequence S. Therefore, in certain embodiments, the debugging session 410 can be performed without the downstream handoff function $D_b$. In certain embodiments, the function B can be debugged via the debugging session 410 based on a set of rules. For instance, the function B can be an event-driven function that is debugged based on a set of rules. In a non-limiting example, if the function B to be debugged is part of a rule $r=t \mapsto B$, then a set of artifacts can be created. A new rule can also be created, where $r'=t \mapsto U_f$, where $U_f$ is an upstream handoff created for the function B. Furthermore, in certain embodiments, when creating a debuggable function, the computing device 114 can determine whether a debuggable function co-opts a name of the original function. For example, when debugging the function B, the computing device 114 determine whether to temporarily rename the function B to function B', and name a upstream handoff function $U_f$ to be the function B. In an aspect, existing interfaces for interacting with the function B can employ the function B'. In an aspect, the debugging session 410 can be initiated by having upstream handoff function $U_f$ co-opt employ a name of the function B. In another aspect, the debugging session 410 can maintain an internal mapping from the function B to the upstream handoff function $U_f$.

Figure 6:
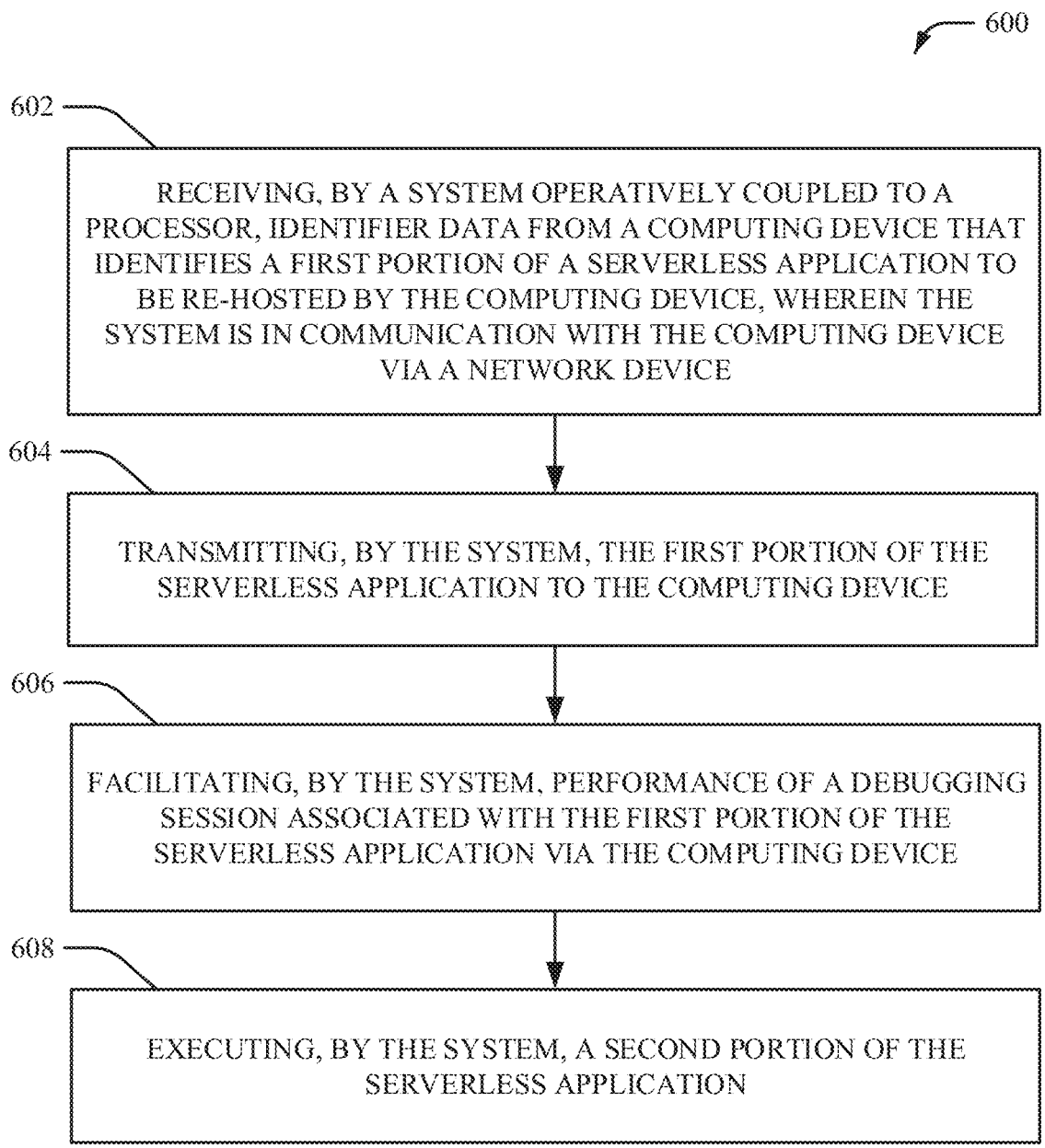
FIG. 6 illustrates a flow diagram of an example, non-limiting computer-implemented method for facilitating a debugging session associated with a serverless application in accordance with one or more embodiments described herein.

FIG. 6 illustrates a flow diagram of an example, non-limiting computer-implemented method 600 for facilitating a debugging session associated with a serverless application in accordance with one or more embodiments described herein. In an embodiment, the method 600 can be associated with the serverless computing component 102. At 602, identifier data that identifies a first portion of a serverless application to be re-hosted by a computing device is received, by a system operatively coupled to a processor (e.g., by interface component 104), from the computing device, where the system is in communication with the computing device via a network device. At 604, the first portion of the serverless application is transmitted, by the system (e.g., by interface component 104 or broker component 108), to the computing device. At 606, performance of a debugging session associated with the first portion of the serverless application is facilitated, by the system (e.g., by rewriter component 106), via the computing device. At 608, a second portion of the serverless application is executed by the system (e.g., by rewriter component 106). Additionally or alternatively, the second portion of the serverless application can be executed by a server and/or a serverless cloud computing platform associated with the system. In an embodiment, the method 600 can further include receiving, by the system (e.g., by interface component 104), a modified version of the first portion of the serverless application from the computing device. Additionally, the method 600 can further include combining, by the system (e.g., by rewriter component 106), the modified version of the first portion of the serverless application with the second portion of the serverless application. In certain embodiments, the method 600 can further include executing, by the system (e.g., by rewriter component 106), the second portion of the serverless application based on real-time data associated with the debugging session. Furthermore, in certain embodiments, the method 600 can further include executing the second portion of the serverless application while the computing device performs the debugging session associated with the first portion of the serverless application (e.g., to facilitate a reduced number of errors associated with the serverless application and/or to facilitate improved performance of the serverless application).

Figure 7:
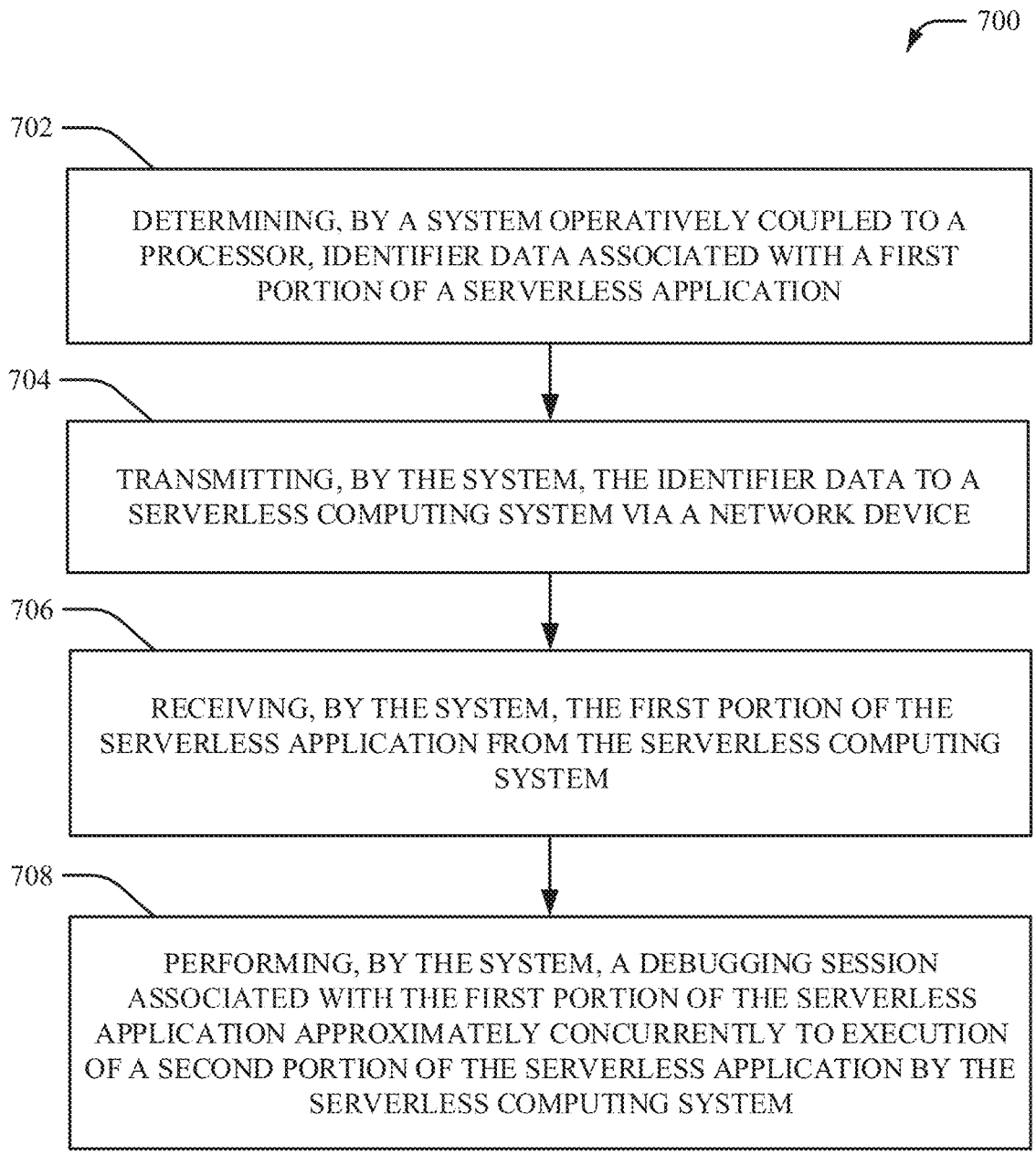
FIG. 7 illustrates a flow diagram of another example, non-limiting computer-implemented method for facilitating a debugging session associated with a serverless application in accordance with one or more embodiments described herein.

FIG. 7 illustrates a flow diagram of an example, non-limiting computer-implemented method 700 for facilitating a debugging session associated with a serverless application in accordance with one or more embodiments described herein. In an embodiment, the method 700 can be associated with the computing device 114. At 702, identifier data associated with a first portion of a serverless application is determined, by a system operatively coupled to a processor (e.g., by identification component 202). At 704, the identifier data is transmitted, by the system (e.g., by identification component 202), to a serverless computing system via a network device. At 706, the first portion of the serverless application is received, by the system (e.g., by debugging component 204), from the serverless computing system. At 708, a debugging session associated with the first portion of the serverless application is performed, by the system (e.g., by debugging component 204), approximately concurrently to execution of a second portion of the serverless application by the serverless computing system. In an embodiment, the method 700 can further include communicating, by the system (e.g., by identification component 202 or debugging component 204), with the serverless computing system via a network device. In another embodiment, the method 700 can further include transmitting, by the system (e.g., by debugging component 204), a modified version of the first portion of the serverless application to the serverless computing system. In yet another embodiment, the method 700 can further include transmitting, by the system (e.g., by debugging component 204), real-time data associated with the debugging session to the serverless computing system. In certain embodiments, the method 700 can include employing a debugger application via a computing device that is in communication with the serverless computing system via a network device.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least executing a serverless application and transmitting a portion of a serverless application via a network (e.g., communication between a computing device and a server) are established from a combination of electrical and mechanical components and circuitry, a human is unable to replicate or perform processing performed by a serverless computing component (e.g., the serverless computing component 102) and/or a computing device (e.g., computing device 114 disclosed herein. For example, a human is unable to execute a serverless computing component, a human is unable to communicate data and/or packetized data associated with a serverless application between a computing device and a server, etc.

Figure 8:
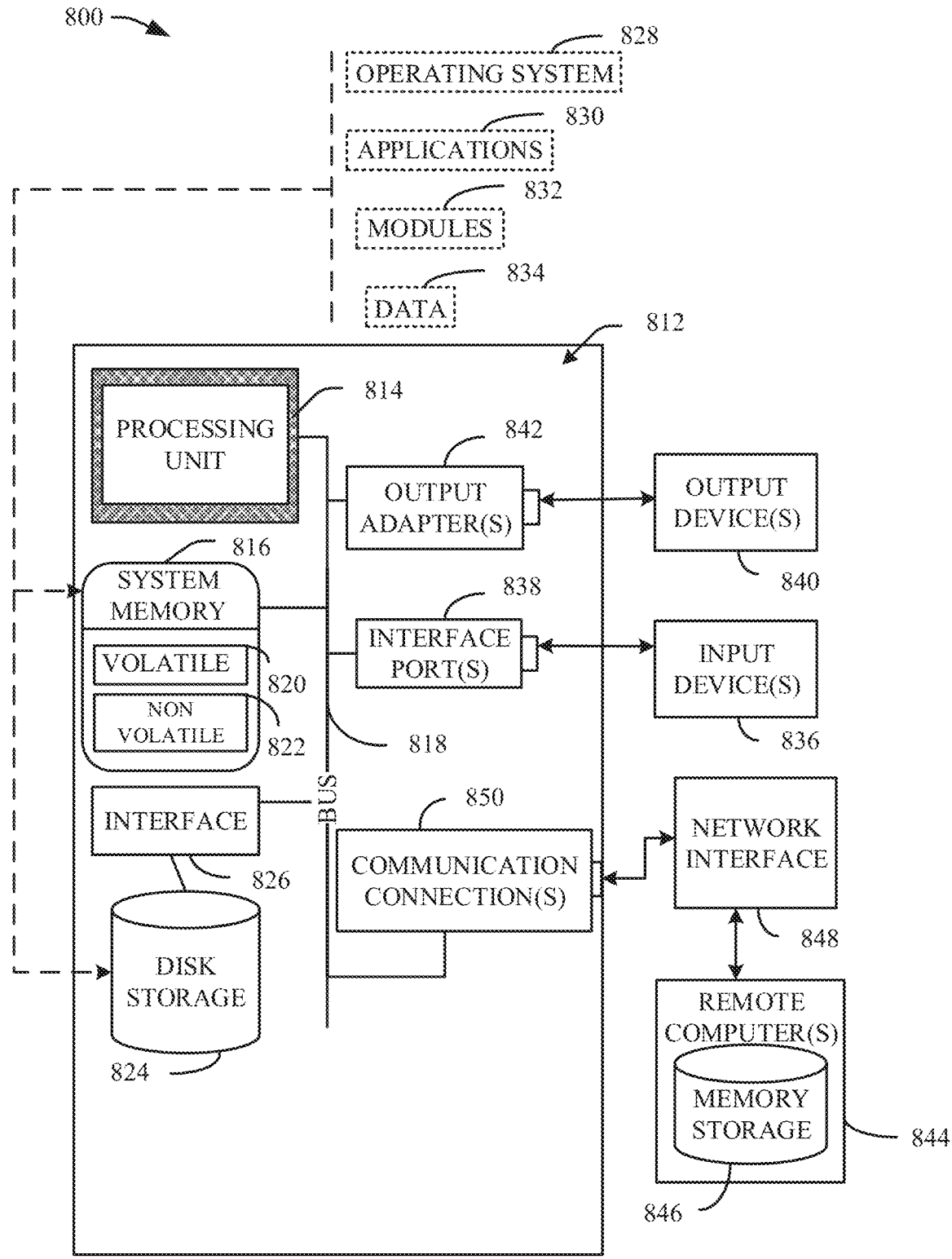
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection (s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
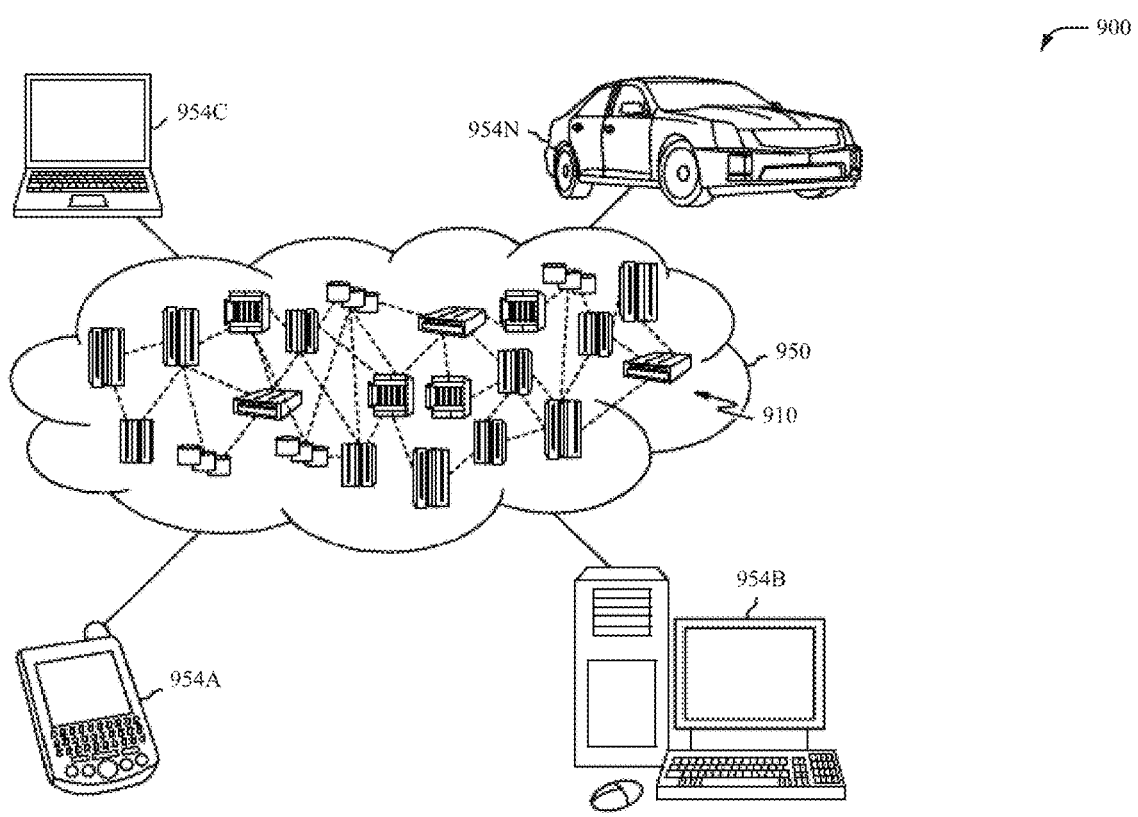
FIG. 9 illustrates a block diagram of an example, non-limiting cloud computing environment in accordance with one or more embodiments described herein.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
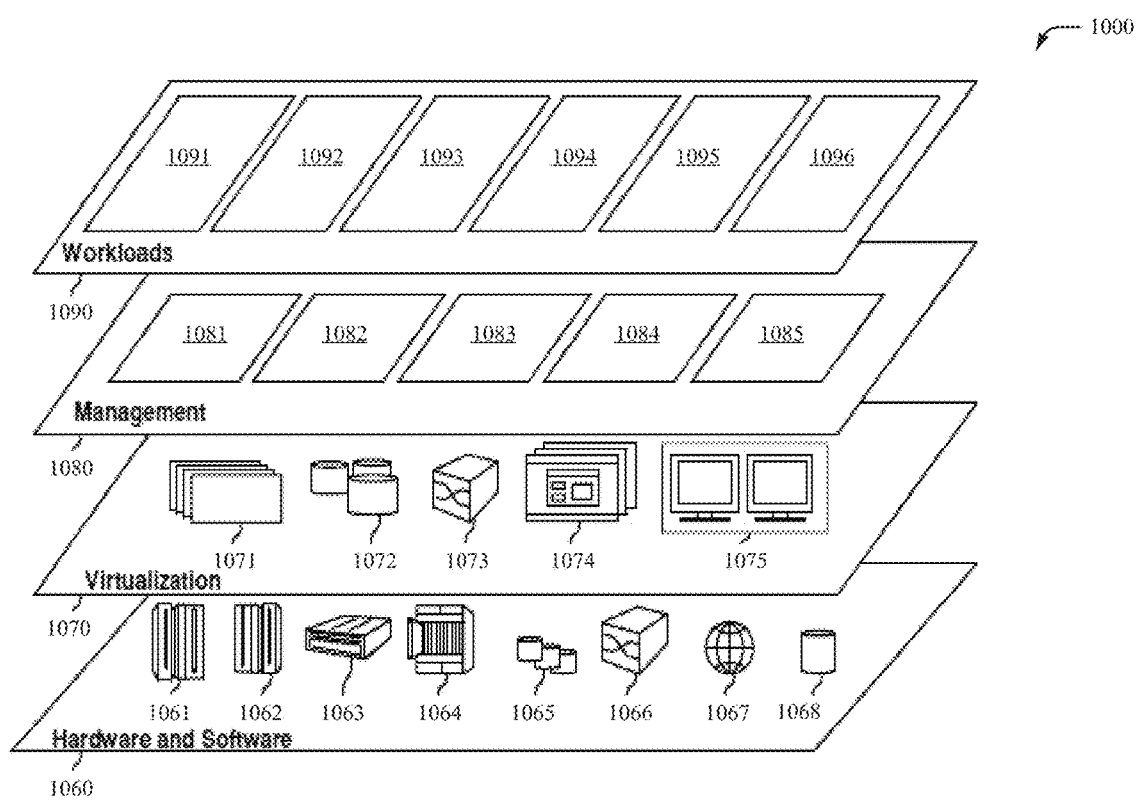
FIG. 10 illustrates a block diagram of example, non-limiting abstraction model layers in accordance with one or more embodiments described herein.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and mobile desktop 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes computer executable components stored in the memory, wherein the computer executable components comprise:
a rewriter component that rewrites a serverless application to allow a first portion of the serverless application to be executed by a computing device and a second portion of the serverless application to be executed by a serverless computing system, wherein the first portion of the serverless application is re-routed to the computing device to facilitate a debugging session for the first portion of the serverless application that is performed by the computing device.

2. The system of claim 1, further comprising:
an interface component of the system that receives a modified version of the first portion of the serverless application from the computing device.

3. The system of claim 2, wherein the rewriter component combines the modified version of the first portion of the serverless application with the second portion of the serverless application.

4. The system of claim 1, wherein the serverless computing system executes a set of processing threads associated with the second portion of the serverless application during a first time period.

5. The system of claim 4, wherein the computing device performs the debugging session associated with the first portion of the serverless application during a second time period, and wherein the first time period and the second time period are concurrent.

6. The system of claim 1, wherein the first portion of the serverless application is a first function in a sequence of functions, and wherein an interface component of the system re-routes the first function to the computing device.

7. The system of claim 6, wherein the rewriter component generates a second function prior to the first function in a sequence of instructions, and wherein the rewriter component generates a third function after the first function in the sequence of instructions.

8. The system of claim 7, wherein the rewriter component executes the second function and the third function after the first function is re-routed to the computing device.

9. The system of claim 1, wherein an interface component of the system receives real-time data associated with the debugging session associated with the first portion of the serverless application.

10. The system of claim 9, wherein the rewriter component executes the second portion of the serverless application based on the real-time data associated with the debugging session.

11. The system of claim 1, wherein an interface component of the system re-routes the first portion of the serverless application to the computing device to facilitate improved performance of the serverless application.

12. The system of claim 1, wherein a first mode of the debugging session for the serverless application is performed based on user data provided to the computing device, and wherein the user data comprises a set of actions associated with one or more processing points related to the serverless application.

13. The system of claim 1, wherein a first mode of the debugging session for the serverless application employs a trampoline computing process that forwards an invocation signal from the computing device to a serverless computing component.

14. The system of claim 13, wherein the invocation signal comprises a set of parameters for an invocation to invoke a programmable operator within computer code of the serverless application.

15. A computer program product for debugging a serverless application, the computer program product comprising a computer readable storage medium having program instructions embodied therewith, the program instructions executable by processor to cause the processor to:
rewrites, by the processor, a serverless application to allow a first portion of the serverless application to be executed by a computing device and a second portion of the serverless application to be executed by a serverless computing system, wherein the first portion of the serverless application is re-routed to the computing device to facilitate a debugging session for the first portion of the serverless application that is performed by the computing device.

16. The computer program product of claim 15, wherein the program instructions are executable by processor to further cause the processor to:
receives, by the processor, receives a modified version of the first portion of the serverless application from the computing device; and
combines the modified version of the first portion of the serverless application with the second portion of the serverless application.

17. The computer program product of claim 15, wherein the serverless computing system executes a set of processing threads associated with the second portion of the serverless application during a first time period, wherein the computing device performs the debugging session associated with the first portion of the serverless application during a second time period, and wherein the first time period and the second time period are concurrent.

18. A computer-implemented method, comprising:
rewriting, by a device operative coupled to a processor, a serverless application to allow a first portion of the serverless application to be executed by a computing device and a second portion of the serverless application to be executed by a serverless computing system, wherein the first portion of the serverless application is re-routed to the computing device to facilitate a debugging session for the first portion of the serverless application that is performed by the computing device.

19. The computer-implemented method of claim 18, wherein a first mode of the debugging session for the serverless application is performed based on user data provided to the computing device, and wherein the user data comprises a set of actions associated with one or more processing points related to the serverless application.

20. The computer-implemented method of claim 18, wherein a first mode of the debugging session for the serverless application employs a trampoline computing process that forwards an invocation signal from the computing device to the serverless computing system.

* * * * *